US012701520B2

(12) United States Patent
Zhang et al.

(10) Patent No.: US 12,701,520 B2
(45) Date of Patent: Aug. 4, 2026

(54) CONFIGURING REFERENCE SIGNALING RESOURCE SETS

(71) Applicant: ZTE CORPORATION, Shenzhen (CN)

(72) Inventors: Shujuan Zhang, Shenzhen (CN); Hao Wu, Shenzhen (CN); Yang Zhang, Shenzhen (CN); Chuangxin Jiang, Shenzhen (CN); Yu Pan, Shenzhen (CN); Zhaohua Lu, Shenzhen (CN)

(73) Assignee: ZTE Corporation, Shenzhen (CN)

( * ) Notice: Subject to any disclaimer, the term of this patent is extended or adjusted under 35 U.S.C. 154(b) by 213 days.

(21) Appl. No.: 18/520,102

(22) Filed: Nov. 27, 2023

(65) Prior Publication Data

US 2024/0163820 A1 May 16, 2024

Related U.S. Application Data

(63) Continuation of application No. PCT/CN2021/111200, filed on Aug. 6, 2021.

(51) Int. Cl.
*H04W 56/00* (2009.01)
*H04L 5/00* (2006.01)
*H04W 76/20* (2018.01)
*H04W 74/0833* (2024.01)

(52) U.S. Cl.
CPC ....... *H04W 56/0015* (2013.01); *H04L 5/0051* (2013.01); *H04W 76/20* (2018.02); *H04W 74/0833* (2013.01)

(58) Field of Classification Search
CPC ............. H04W 56/0015; H04W 76/20; H04W 74/0833; H04L 5/0051
See application file for complete search history.

(56) References Cited

U.S. PATENT DOCUMENTS

| | | | |
|---|---|---|---|
| 2019/0312698 A1* | 10/2019 | Akkarakaran | ........ H04L 5/0048 |
| 2020/0119797 A1 | 4/2020 | Wang et al. | |
| 2020/0154402 A1* | 5/2020 | Lee | ........................ H04L 5/0048 |
| 2021/0105165 A1* | 4/2021 | Ko | ........................ H04L 5/0048 |
| 2021/0112600 A1* | 4/2021 | Lei | ........................ H04W 72/04 |
| 2022/0053526 A1* | 2/2022 | Kang | .................... H04L 5/0044 |
| 2022/0361016 A1* | 11/2022 | Matsumura | ............ H04B 7/088 |
| 2023/0051117 A1* | 2/2023 | Tsai | ...................... H04L 5/0048 |

(Continued)

FOREIGN PATENT DOCUMENTS

| | | |
|---|---|---|
| CN | 108400803 A | 8/2018 |
| CN | 109302272 A | 2/2019 |
| CN | 112205054 A | 1/2021 |

OTHER PUBLICATIONS

Remaining issues and test proposals for beam management (Year: 2018).*

(Continued)

*Primary Examiner* — Mewale A Ambaye
(74) *Attorney, Agent, or Firm* — Foley & Lardner LLP

(57) ABSTRACT

Presented are systems, methods, apparatuses, or computer-readable media for configuring reference signaling. A wireless communication device may determine a set of resources. A number of resources in the set may be equal to or more than one and the set satisfies a character. Each of the resources may be associated with a respective value of information.

20 Claims, 7 Drawing Sheets

(56)                    References Cited

U.S. PATENT DOCUMENTS

2024/0334538 A1 *  10/2024  Zhou ................. H04W 52/0216

OTHER PUBLICATIONS

Apple Inc., "On Beam Management Enhancement," 3GPP TSG-RAN WG1 Meeting #105-e, R1-2105087, e-Meeting, May 10, 2021 (23 pages).
CATT, "Enhancements on multi-beam operation," 3GPP TSG RAN WG1 #104-e, R1-2100343, e-Meeting, Jan. 25, 2021 (17 pages).
Ericsson, "Enhancements on Multi-beam Operation," 3GPP TSG-RAN WG1 Meeting #105-e, Tdoc R1-2105828, e-Meeting, May 10, 2021 (31 pages).
International Search Report and Written Opinion for PCT Appl. No. PCT/CN2021/111200, mailed on Apr. 26, 2022 (6 pages).
Moderator (CATT), "Moderator summary #1 on M-TRP simultaneous transmission with multiple Rx panels," 3GPP TSG RAN WG1 #104b-e, R1-2103858, e-Meeting, Apr. 12, 2021 (40 pages).
Moderator (Intel Corporation), "Issue Summary for initial access aspects of NR extension up to 71 GHz," 3GPP TSG RAN WG1 Meeting #105-e, R1-2105977, e-Meeting, May 10, 2021 (30 pages).
Moderator (Samsung), "Moderator summary for multi-beam enhancement," 3GPP TSG RAN WG1 #105-e, R1-2105290, e-Meeting, May 10, 2021 (67 pages).
Nokia, "Enhancements on Beam Management for Multi-TRP," 3GPP TSG RAN WG1 #105-e, R1-2105275, e-Meeting, May 10, 2021 (14 pages).
NTT DOCOMO, Inc., "Discussion on multi-beam operation," 3GPP TSG RAN WG1 #105, R1-2105683, e-Meeting, May 10, 2021 (17 pages).
OPPO, "Remaining Issues and Text Proposals for Beam Management", 3GPP TSG RAN WG1 Meeting #93, R1-1806840, May 25, 2018, Busan, Korea (8 pages).
Sony, "Further enhancement on multi-beam operation," 3GPP TSG RAN WG1#104e, R1-2100844, e-Meeting, Jan. 25, 2021 (18 pages).
ZTE, "Enhancements on Multi-beam Operation," 3GPP TSG RAN WG1 Meeting #104b-e, R1-2102660, e-Meeting, Apr. 12, 2021 (25 pages).
Extended European Search Report for EP Appl. No. 21952407.1, dated Sep. 2, 2024 (11 pages).

* cited by examiner

400 raster 1: SSB {1~64} raster 2: SSB {1~64}

FIG. 4

CONFIGURING REFERENCE SIGNALING RESOURCE SETS

CROSS-REFERENCE TO RELATED APPLICATION

This application claims the benefit of priority under 35 U.S.C. § 120 as a continuation of International Patent Application No. PCT/CN2021/111200, filed on Aug. 6, 2021, the disclosure of which is incorporated herein by reference in its entirety.

TECHNICAL FIELD

The disclosure relates generally to wireless communications, including but not limited to systems and methods for configuring reference signaling.

BACKGROUND

The standardization organization Third Generation Partnership Project (3GPP) is currently in the process of specifying a new Radio Interface called 5G New Radio (5G NR) as well as a Next Generation Packet Core Network (NG-CN or NGC). The 5G NR will have three main components: a 5G Access Network (5G-AN), a 5G Core Network (5GC), and a User Equipment (UE). In order to facilitate the enablement of different data services and requirements, the elements of the 5GC, also called Network Functions, have been simplified with some of them being software based so that they could be adapted according to need.

SUMMARY

The example embodiments disclosed herein are directed to solving the issues relating to one or more of the problems presented in the prior art, as well as providing additional features that will become readily apparent by reference to the following detailed description when taken in conjunction with the accompany drawings. In accordance with various embodiments, example systems, methods, devices and computer program products are disclosed herein. It is understood, however, that these embodiments are presented by way of example and are not limiting, and it will be apparent to those of ordinary skill in the art who read the present disclosure that various modifications to the disclosed embodiments can be made while remaining within the scope of this disclosure.

At least one aspect is directed to a system, a method, an apparatus, or a computer-readable medium for configuring reference signaling. A wireless communication device may determine a set of resources that satisfies a characteristic. A number of resources in the set may be equal to or more than one. Each of the resources may be associated with a respective value of information.

In some embodiments, the information may include at least one of: a serving cell index, a synchronization raster index, a physical cell index (PCI), a channel state information reference signal (CSI-RS) index, or a synchronization signal block (SSB) index. In some embodiments, the characteristic may indicate that the set of resources is in a group for channel measurement. In some embodiments, the group may be associated with one reporting of channel state information (CSI).

In some embodiments, the wireless communication device may receive reference signals (RSs) of the resources of the set corresponding to the group. In some embodiments, the wireless communication device may determine channel state information (CSI) from the RSs. In some embodiments, the wireless communication device may report the CSI to the wireless communication node. In some embodiments, the CSI may be based on the group.

In some embodiments, the CSI may include at least one of: a CSI reference signal resource indicator (CRI), a synchronization signal block (SSB) resource indicator (SSB-RI), or a set index, corresponding to the set. In some embodiments, the CRI, the SSB-RI, or the set index may be reported or indicated using a number of bits that is based on a total number of sets of the group. In some embodiments, the CRI, the SSB-RI, or the set index may be reported or indicated by transmitting a physical random access channel (PRACH) resource from a PRACH resource group associated with the set. In some embodiments, the group may include multiple sets each satisfying the characteristic, and the number of resources in the set may be more than one.

In some embodiments, the CSI further may include a quality indicator corresponding to the set. In some embodiments, the quality indicator may be indicative of: an average quality of resources of the set, a highest quality between the resources of the set, or quality of a predefined resource of the set. In some embodiments, the wireless communication device may determine the CSI according to transmitting power differences between resources of the set.

In some embodiments, the group may include a plurality of subgroups. Each of the subgroups may correspond to a respective value of the information, or each of the subgroups may have resources in the group corresponding to a same value of the information.

In some embodiments, a resource in the group may be configured with a value of the information. In some embodiments, if the information includes the serving cell index, a resource in the group may be configured with an index of a serving cell, which may indicate that the resource is located in the serving cell.

In some embodiments, the group may include a plurality of sets. Each of the sets may respectively satisfy the characteristic. In some embodiments, a first set of the plurality of sets may include resources from a plurality of subgroups of the group. Each of the subgroups may correspond to a respective value of the information, or each of the subgroups may have resources in the group corresponding to a same value of the information.

In some embodiments, the resources in the first set may be from the plurality of subgroups of the group and satisfy a condition. In some embodiments, the first set may be determined as having resources that are from the plurality of subgroups of the group and satisfy the condition. In some embodiments, the condition may be based on at least one of: a resource index among resources in each subgroup, a time location occupied by the resources in each subgroup, the value of the information, or a frequency location occupied by the resources in each subgroup.

In some embodiments, the condition may include a condition that resource indexes of the resources in the first set are same. A resource index of one of the resources in the first set may be a resource index among resources in one subgroup corresponding to the one of the resources. In some embodiments, the condition may include a condition that time locations occupied by the resources in the first set are different. In some embodiments, the condition may include a condition that frequency locations occupied by the resources in the one subgroup are different.

In some embodiments, the condition may include a condition that a resource index X of a first resource and a resource index Y of a second resource, satisfy: $(X-Y)mod$ $M=b$. The resources in the first set may include the first resource and the second resource. The first resource and the second resource may be associated with a respective value of the information.

In some embodiments, the condition may include a condition that the resource index X of the first resource and the resource index Y of the second resource, satisfy $(X-Y)mod$ $M=i*b$. The resources in the first set may include the first resource and the second resource, the first resource and the second resource may be associated with a respective value of the information. M and b may each an integer value, and i is a value of the information associated with the first resource or second resource. A resource index of one of the resources in the first set may be a resource index among resources in one subgroup corresponding to the one of the resources.

In some embodiments, at least one of M, b, or a number of multiple pieces of the information may be based on system information. M may be maximum number of SSBs in a half frame for one synchronization raster. i may be a value of the information among the multiple pieces of the information. A number of the resources in the first set may be equal to or larger than the number of the multiple pieces of the information, or the first set may include resources each of which is associated with one piece of the information from the multiple pieces of the information.

In some embodiments, the group may be configured with a repetition parameter. In some embodiments, if the group is configured with the repetition parameter, the group may include the set. In some embodiments, if the group is not configured with the repetition parameter, the group may include resources each with a same value of the information.

In some embodiments, if the information includes a synchronization raster index, the wireless communication device may determine the set having synchronization signal blocks (SSBs) each corresponding to a respective synchronization raster and the set satisfying the characteristic.

In some embodiments, the SSBs may be determined to in the set according to at least one of: system information, a physical cell index (PCI) group, or a frequency location occupied by the synchronization rasters. In some embodiments, if a condition is met, a first SSB in a first synchronization raster and a second SSB in a second synchronization raster may be in the set satisfying the characteristic.

In some embodiments, the system information may include information about the SSBs, which may include at least one of: a PCI index, information of a synchronization raster, or information on whether the wireless communication device can assume that the SSBs in different synchronization rasters are in the set satisfying the characteristic.

In some embodiments, if the information includes a PCI, the wireless communication device may determine the set having synchronization signal blocks (SSBs) each of which is associated with a respective PCI and are in a same frequency, and the set satisfies the characteristic. In some embodiments, if a condition is met, a first SSB with a first PCI and a second SSB with a second PCI may satisfy the characteristic.

In some embodiments, the SSBs may be in the set satisfying the characteristic according to at least one of: system information, a PCI group, or a frequency location of the SSBs. In some embodiments, the condition may be based on at least one of: SSB indexes of the first SSB and the second SSB, time location occupied by the first SSB and the second SSB, or a value of the information associated with the first SSB or the second SSB In some embodiments, the condition may include a condition that the time location occupied by the first SSB and the second SSB are in different times. In some embodiments, the condition may include a condition that an index (X) of the first SSB and an index (Y) of the second SSB, satisfy: $(X-Y)mod$ $M=b$. In some embodiments, the condition may include a condition that the index (X) of the first SSB and the index (Y) of the second SSB, satisfy: $X=Y$. In some embodiments, the condition may include a condition that the index (X) of the first SSB and the index (Y) of the second SSB, satisfy: $(X-Y)mod$ $M=i*b$. In some embodiments, a condition that a first PCI associated the first SSB and a second PCI associated with the second SSB may have corresponding relationship. M and b may each be an integer value. i may be an index of the information associated with the first SSB or the second SSB. X may be the index of the first SSB among SSBs associated with a same value of the information as that corresponding to the first SSB. Y may be the index of the second SSB among SSBs associated with a same value of the information as that corresponding to the second SSB.

In some embodiments, at least one of M, b, or a number of multiple pieces of the information may be based on system information. M may be maximum number of SSBs in a half frame for one synchronization raster. i may be a value of the information among the multiple pieces of the information. A number of SSBs in the set may be equal to or larger than the number of the multiple pieces of the information, or the set may include SSBs each of which is associated with one piece of the information from the multiple pieces of the information.

In some embodiments, the system information may include information associated with the SSBs which may include at least one of: a PCI group, information of the same frequency, or information on whether the wireless communication device can assume that two SSBs associated with different PCIs in a predefined PCI group in a predefined frequency are in one set satisfying the characteristic. In some embodiments, a parameter configuration of the synchronization rasters or the SSBs may satisfy a defined restriction. In some embodiments, a configuration of the SSBs may satisfy a defined restriction.

In some embodiments, the wireless communication device may determine a plurality of reference signal (RS) resources. In some embodiments, the wireless communication device may determine the set of resources including resources from the plurality of RS resources. In some embodiments, the wireless communication device may determine an available resource of a channel or signal according to the set. In some embodiments, each of the RS resources may include at least one of: one SSB resource or a periodic channel state information (CSI) reference signal (CSI-RS) resource.

In some embodiments, a number of resources in the set may be smaller than a number of the plurality of RS resources. In some embodiments, the plurality of RS resources may be in a same frequency band. In some embodiments, the number of RS resources in the set may be one.

In some embodiments, if each of the RS resources includes a SSB resource, the plurality of RS resources may include a plurality of SSB resources which includes transmitted SSB resources that are indicated by signaling from a wireless communication node. In some embodiments, the plurality of RS resources may correspond to one serving cell or one physical cell index (PCI), or may be in a same SSB frequency.

In some embodiments, the wireless communication device may determine the set according to a transmission configuration indicator (TCI) state or a spatial relation associated of the channel or signal or a list of activated TCI states for a downlink channel in a serving cell. In some embodiments, a resource element (RE) or physical resource block (PRB) or orthogonal frequency division multiplexing (OFDM) symbol occupied by a synchronization signal of one SSB resource in the set may be an unavailable resource for the channel or signal. In some embodiments, the RE or PRB or OFDM symbol occupied by a physical broadcast channel of the one SSB resource in the set may be an available resource for the channel or signal.

In some embodiments, the resources in the set may include at least one of: measurement reference signal (RS) resources, channel state information RS (CSI-RS) resources, or synchronization signal block (SSB) resources. In some embodiments, in the case that the number of the resources in the set is more than one, the set may include different resources associated with different values of the information.

In some embodiments, the wireless communication device may determine multiple sets. Each of the multiple sets may respectively satisfy the characteristic and each of resources in the corresponding set may be associated with a respective value of the information. In some embodiments, the wireless communication device may determine a mapping between groups of physical random access channel (PRACH) resources and the multiple sets. In some embodiments, the wireless communication device may select a set from the multiple sets. In some embodiments, the wireless communication device may transmit a PRACH resource from a group of PRACH resources associated with the selected set.

In some embodiments, the wireless communication device may receive a reference signal in the resources of the set according to the characteristic. In some embodiments, the wireless communication device may receive a channel or signal. An unavailable resource for the channel or signal may be based on the resources of the set.

In some embodiments, the characteristic may include the resources in the set are in a group for channel measurement. In some embodiments, the characteristic may include the resources in the set satisfy a quasi co-location (QCL) relationship. In some embodiments, the characteristic may include transmitting filters between the resources in the set are same. In some embodiments, the set is associated with a repetition parameter with value 'on'. In some embodiments, the set may be for channel measurement. In some embodiments, the set may correspond to one group of physical random access channel (PRACH) resources. In some embodiments, the set may correspond to one channel or signal. The unavailable resource of the one channel or signal may be based on the set. In some embodiments, the set may be associated with one channel state information (CSI) reporting.

In some embodiments, the group for channel measurement may include multiple sets. Each of the multiple sets may satisfy the characteristic. In some embodiments, the group is associated with a repetition parameter with value 'off'. In some embodiments, the resources in the set satisfy a quasi co-location (QCL) relationship with respect to spatial receive parameter. In some embodiments, each of resources in the corresponding set may be associated with a respective value of the information.

In some embodiments, the group for channel measurement may be associated with one reporting, and a number groups associated with the one reporting may be more than or equal to one. In some embodiments, in the case that the set includes more than one resource, the more than two resources may be associated with different values of the information. In some embodiments, a wireless communication device may determine the set according to a received signaling.

BRIEF DESCRIPTION OF THE DRAWINGS

Various example embodiments of the present solution are described in detail below with reference to the following figures or drawings. The drawings are provided for purposes of illustration only and merely depict example embodiments of the present solution to facilitate the reader's understanding of the present solution. Therefore, the drawings should not be considered limiting of the breadth, scope, or applicability of the present solution. It should be noted that for clarity and ease of illustration, these drawings are not necessarily drawn to scale.

FIG. 4 illustrates a block diagram of an example set of synchronization signal blocks (SSBs) including SSB in different synchronization rasters in accordance with some embodiments of the present disclosure;

DETAILED DESCRIPTION

Various example embodiments of the present solution are described below with reference to the accompanying figures to enable a person of ordinary skill in the art to make and use the present solution. As would be apparent to those of ordinary skill in the art, after reading the present disclosure, various changes or modifications to the examples described herein can be made without departing from the scope of the present solution. Thus, the present solution is not limited to the example embodiments and applications described and illustrated herein. Additionally, the specific order or hierarchy of steps in the methods disclosed herein are merely example approaches. Based upon design preferences, the specific order or hierarchy of steps of the disclosed methods or processes can be re-arranged while remaining within the scope of the present solution. Thus, those of ordinary skill in the art will understand that the methods and techniques disclosed herein present various steps or acts in a sample order, and the present solution is not limited to the specific order or hierarchy presented unless expressly stated otherwise.

1. Mobile Communication Technology and Environment

Figure 1:
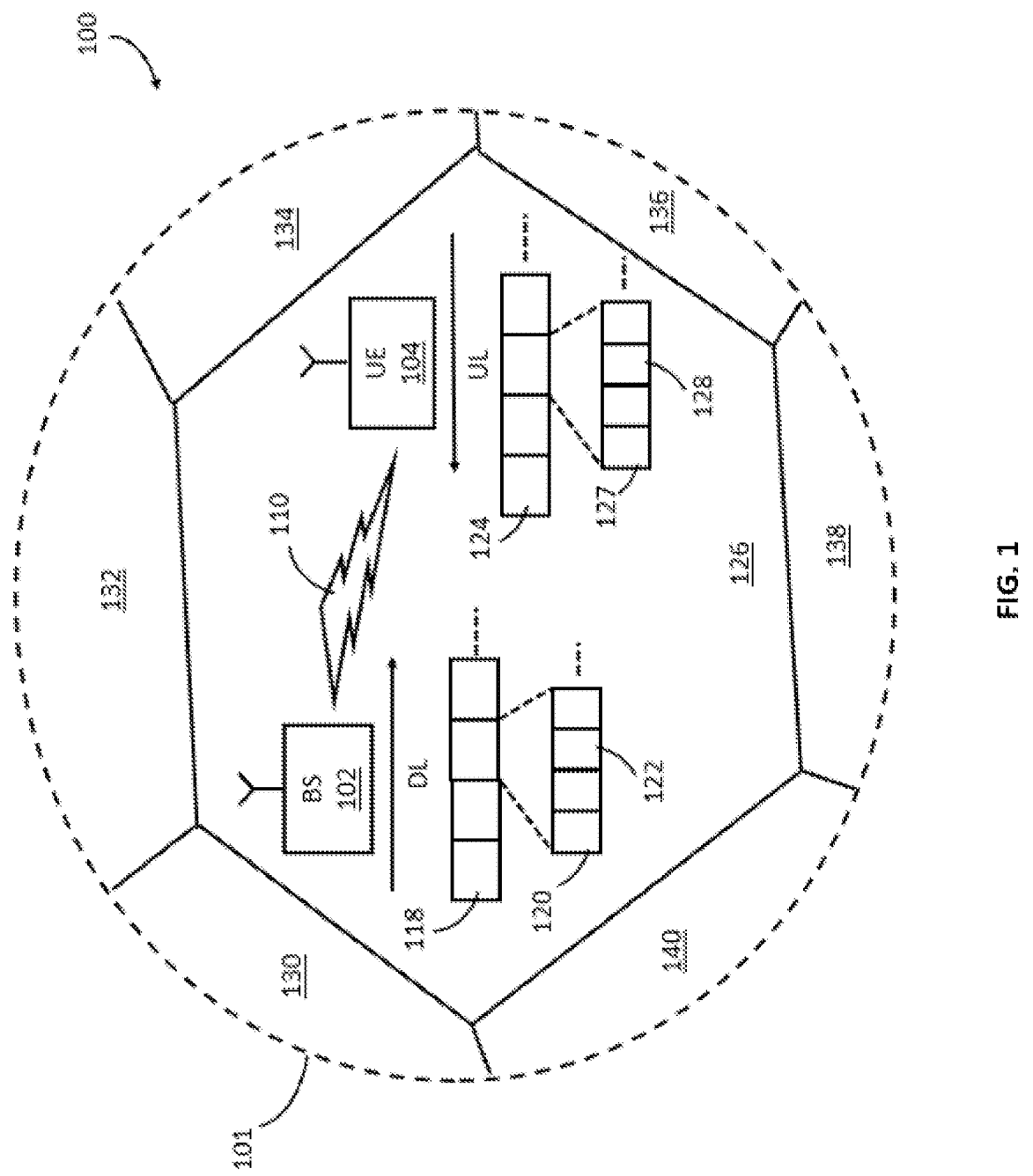
FIG. 1 illustrates an example cellular communication network in which techniques disclosed herein may be implemented, in accordance with an embodiment of the present disclosure.

FIG. 1 illustrates an example wireless communication network, and/or system, 100 in which techniques disclosed herein may be implemented, in accordance with an embodiment of the present disclosure. In the following discussion, the wireless communication network 100 may be any wireless network, such as a cellular network or a narrowband Internet of things (NB-IoT) network, and is herein referred to as "network 100." Such an example network 100 includes a base station 102 (hereinafter "BS 102"; also referred to as wireless communication node) and a user equipment device 104 (hereinafter "UE 104"; also referred to as wireless communication device) that can communicate with each other via a communication link 110 (e.g., a wireless communication channel), and a cluster of cells 126, 130, 132, 134, 136, 138 and 140 overlaying a geographical area 101. In FIG. 1, the BS 102 and UE 104 are contained within a respective geographic boundary of cell 126. Each of the other cells 130, 132, 134, 136, 138 and 140 may include at least one base station operating at its allocated bandwidth to provide adequate radio coverage to its intended users.

For example, the BS 102 may operate at an allocated channel transmission bandwidth to provide adequate coverage to the UE 104. The BS 102 and the UE 104 may communicate via a downlink radio frame 118, and an uplink radio frame 124 respectively. Each radio frame 118/124 may be further divided into sub-frames 120/127 which may include data symbols 122/128. In the present disclosure, the BS 102 and UE 104 are described herein as non-limiting examples of "communication nodes," generally, which can practice the methods disclosed herein. Such communication nodes may be capable of wireless and/or wired communications, in accordance with various embodiments of the present solution.

Figure 2:
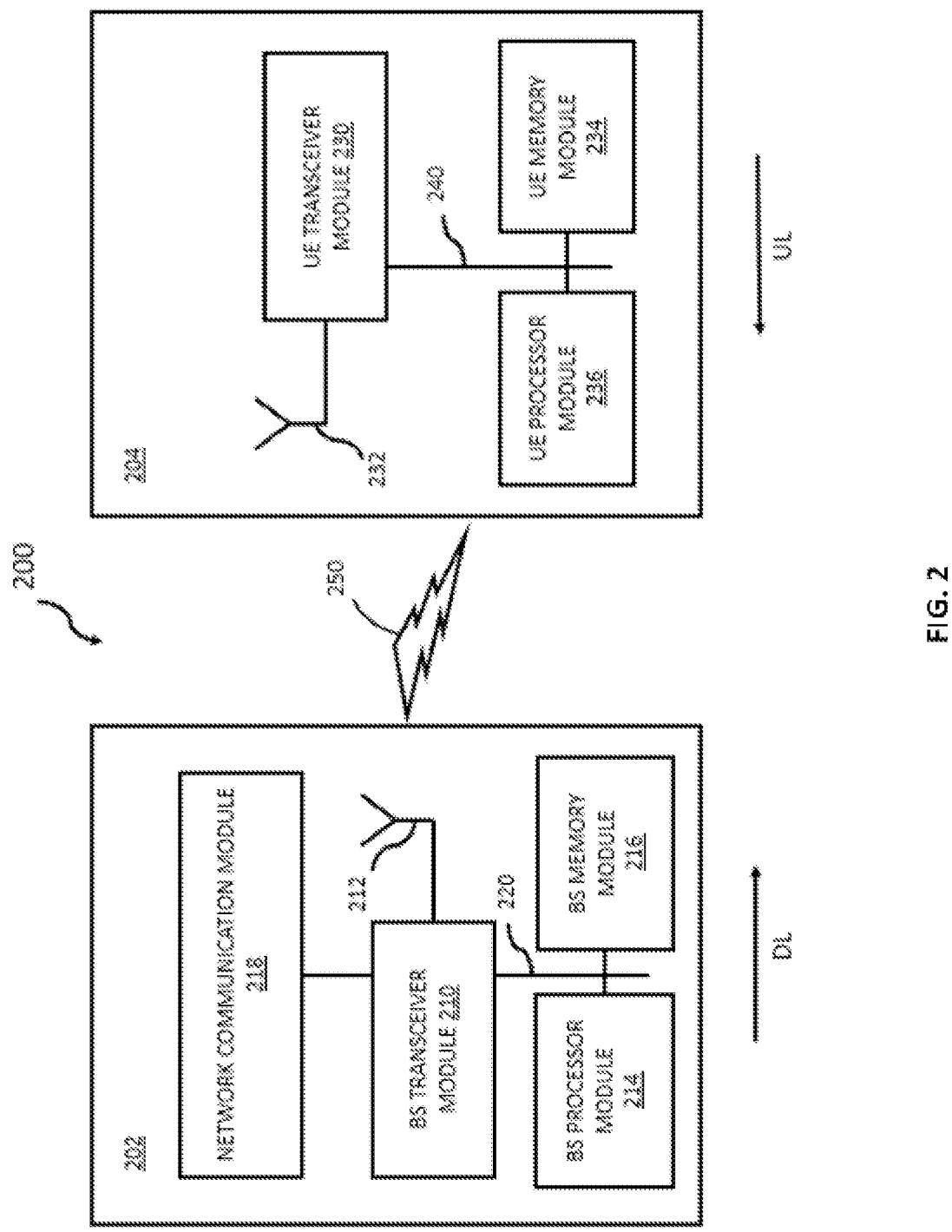
FIG. 2 illustrates a block diagram of an example base station and a user equipment device, in accordance with some embodiments of the present disclosure.

FIG. 2 illustrates a block diagram of an example wireless communication system 200 for transmitting and receiving wireless communication signals (e.g., OFDM/OFDMA signals) in accordance with some embodiments of the present solution. The system 200 may include components and elements configured to support known or conventional operating features that need not be described in detail herein. In one illustrative embodiment, system 200 can be used to communicate (e.g., transmit and receive) data symbols in a wireless communication environment such as the wireless communication environment 100 of FIG. 1, as described above.

System 200 generally includes a base station 202 (hereinafter "BS 202") and a user equipment device 204 (hereinafter "UE 204"). The BS 202 includes a BS (base station) transceiver module 210, a BS antenna 212, a BS processor module 214, a BS memory module 216, and a network communication module 218, each module being coupled and interconnected with one another as necessary via a data communication bus 220. The UE 204 includes a UE (user equipment) transceiver module 230, a UE antenna 232, a UE memory module 234, and a UE processor module 236, each module being coupled and interconnected with one another as necessary via a data communication bus 240. The BS 202 communicates with the UE 204 via a communication channel 250, which can be any wireless channel or other medium suitable for transmission of data as described herein.

As would be understood by persons of ordinary skill in the art, system 200 may further include any number of modules other than the modules shown in FIG. 2. Those skilled in the art will understand that the various illustrative blocks, modules, circuits, and processing logic described in connection with the embodiments disclosed herein may be implemented in hardware, computer-readable software, firmware, or any practical combination thereof. To clearly illustrate this interchangeability and compatibility of hardware, firmware, and software, various illustrative components, blocks, modules, circuits, and steps are described generally in terms of their functionality. Whether such functionality is implemented as hardware, firmware, or software can depend upon the particular application and design constraints imposed on the overall system. Those familiar with the concepts described herein may implement such functionality in a suitable manner for each particular application, but such implementation decisions should not be interpreted as limiting the scope of the present disclosure In accordance with some embodiments, the UE transceiver 230 may be referred to herein as an "uplink" transceiver 230 that includes a radio frequency (RF) transmitter and a RF receiver each comprising circuitry that is coupled to the antenna 232. A duplex switch (not shown) may alternatively couple the uplink transmitter or receiver to the uplink antenna in time duplex fashion. Similarly, in accordance with some embodiments, the BS transceiver 210 may be referred to herein as a "downlink" transceiver 210 that includes a RF transmitter and a RF receiver each comprising circuitry that is coupled to the antenna 212. A downlink duplex switch may alternatively couple the downlink transmitter or receiver to the downlink antenna 212 in time duplex fashion. The operations of the two transceiver modules 210 and 230 may be coordinated in time such that the uplink receiver circuitry is coupled to the uplink antenna 232 for reception of transmissions over the wireless transmission link 250 at the same time that the downlink transmitter is coupled to the downlink antenna 212. Conversely, the operations of the two transceivers 210 and 230 may be coordinated in time such that the downlink receiver is coupled to the downlink antenna 212 for reception of transmissions over the wireless transmission link 250 at the same time that the uplink transmitter is coupled to the uplink antenna 232. In some embodiments, there is close time synchronization with a minimal guard time between changes in duplex direction.

The UE transceiver 230 and the base station transceiver 210 are configured to communicate via the wireless data communication link 250, and cooperate with a suitably configured RF antenna arrangement 212/232 that can support a particular wireless communication protocol and modulation scheme. In some illustrative embodiments, the UE transceiver 210 and the base station transceiver 210 are configured to support industry standards such as the Long Term Evolution (LTE) and emerging 5G standards, and the like. It is understood, however, that the present disclosure is not necessarily limited in application to a particular standard and associated protocols. Rather, the UE transceiver 230 and the base station transceiver 210 may be configured to support alternate, or additional, wireless data communication protocols, including future standards or variations thereof.

In accordance with various embodiments, the BS 202 may be an evolved node B (eNB), a serving eNB, a target eNB, a femto station, or a pico station, for example. In some embodiments, the UE 204 may be embodied in various types of user devices such as a mobile phone, a smart phone, a personal digital assistant (PDA), tablet, laptop computer, wearable computing device, etc. The processor modules 214 and 236 may be implemented, or realized, with a general purpose processor, a content addressable memory, a digital signal processor, an application specific integrated circuit, a field programmable gate array, any suitable programmable logic device, discrete gate or transistor logic, discrete hardware components, or any combination thereof, designed to perform the functions described herein. In this manner, a processor may be realized as a microprocessor, a controller, a microcontroller, a state machine, or the like. A processor may also be implemented as a combination of computing devices, e.g., a combination of a digital signal processor and a microprocessor, a plurality of microprocessors, one or more microprocessors in conjunction with a digital signal processor core, or any other such configuration.

Furthermore, the steps of a method or algorithm described in connection with the embodiments disclosed herein may be embodied directly in hardware, in firmware, in a software module executed by processor modules 214 and 236, respectively, or in any practical combination thereof. The memory modules 216 and 234 may be realized as RAM memory, flash memory, ROM memory, EPROM memory, EEPROM memory, registers, a hard disk, a removable disk, a CD-ROM, or any other form of storage medium known in the art. In this regard, memory modules 216 and 234 may be coupled to the processor modules 210 and 230, respectively, such that the processors modules 210 and 230 can read information from, and write information to, memory modules 216 and 234, respectively. The memory modules 216 and 234 may also be integrated into their respective processor modules 210 and 230. In some embodiments, the memory modules 216 and 234 may each include a cache memory for storing temporary variables or other intermediate information during execution of instructions to be executed by processor modules 210 and 230, respectively. Memory modules 216 and 234 may also each include non-volatile memory for storing instructions to be executed by the processor modules 210 and 230, respectively.

The network communication module 218 generally represents the hardware, software, firmware, processing logic, and/or other components of the base station 202 that enable bi-directional communication between base station transceiver 210 and other network components and communication nodes configured to communication with the base station 202. For example, network communication module 218 may be configured to support internet or WiMAX traffic. In a typical deployment, without limitation, network communication module 218 provides an 802.3 Ethernet interface such that base station transceiver 210 can communicate with a conventional Ethernet based computer network. In this manner, the network communication module 218 may include a physical interface for connection to the computer network (e.g., Mobile Switching Center (MSC)). The terms "configured for," "configured to" and conjugations thereof, as used herein with respect to a specified operation or function, refer to a device, component, circuit, structure, machine, signal, etc., that is physically constructed, programmed, formatted and/or arranged to perform the specified operation or function.

The Open Systems Interconnection (OSI) Model (referred to herein as, "open system interconnection model") is a conceptual and logical layout that defines network communication used by systems (e.g., wireless communication device, wireless communication node) open to interconnection and communication with other systems. The model is broken into seven subcomponents, or layers, each of which represents a conceptual collection of services provided to the layers above and below it. The OSI Model also defines a logical network and effectively describes computer packet transfer by using different layer protocols. The OSI Model may also be referred to as the seven-layer OSI Model or the seven-layer model. In some embodiments, a first layer may be a physical layer. In some embodiments, a second layer may be a Medium Access Control (MAC) layer. In some embodiments, a third layer may be a Radio Link Control (RLC) layer. In some embodiments, a fourth layer may be a Packet Data Convergence Protocol (PDCP) layer. In some embodiments, a fifth layer may be a Radio Resource Control (RRC) layer. In some embodiments, a sixth layer may be a Non Access Stratum (NAS) layer or an Internet Protocol (IP) layer, and the seventh layer being the other layer.

2. Systems and Methods for Configuring Reference Signaling

Properly configuring reference signaling may present two challenges: (1) reducing of the beam sweeping time and access time and (2) improving the efficiency of resource elements (REs) occupied by a synchronization signal block (SSB).

I. Determination of Resource Groups or Set Including Resources in Different Serving for Channel Measurements, Determining PRACH Resource or Rate Mating The UE may determine one measurement resource group for channel measurement. The measurement resource group may include a first measurement resource and a second measurement resource. The first measurement resource and the second measurement resource may be in different serving cell.

In some embodiments, one measurement resource may include a measurement reference signal resource (CMR). The resource can be a CSI-RS resource, or SSB (a synchronization signal and a physical broadcast channel (PBCH) block) resource. In some embodiments, the one measurement resource group may be configured in one channel state information (CSI) reporting setting.

In some embodiments, the UE may receive the first measurement resource and the second measurement resource assuming that they satisfy a characteristic (e.g., a relationship), and/or the UE may receive the first measurement resource and the second measurement resource to get CSI information which will be reported to gNB by the UE. The CSI information may be based on the one measurement resource group for channel measurement. For example, the CSI information may be based on the first measurement resource and the second measurement resource.

In some embodiments, the CSI information may include resource indication, such as CSI resource indicator (CRI), system synchronization block resource indicator (SSB-RI). The CRI may be CSI-RS resource indication. The SSB-RI may be SSB resource indication. The number of bits used to represent the CRI/SSB-RI may be determined based on the characteristic (e.g. a relationship) between resources instead of number of resources in the group such as M+N. For example, the measurement resource group may include N first measurement resource and M second measurement resource. M and/or N may be larger than 1. The number of bits of the CRI/SSB-RI may be based on number of sets (e.g., sometimes referred to as subsets). Each set may include resources satisfying the characteristic. The CRI/SSB-RI also can be named as set index. The one group may include multiple sets each of which includes resources satisfying the characteristic.

In some embodiments, the CRI/SSB-RI may be reported implicitly. For example, one set may correspond to a group of physical random access channel (PRACH) resource. The UE may transmit a PRACH in the PRACH resource selected from the group of PRACH resource. Then, the gNB may obtain the set index or CRI/SSB-RI selected by the UE. The UE can obtain mapping characteristic between multiple sets and multiple PRACH resource groups according to signaling from gNB or a rule. Each of the multiple sets may include resources satisfying the characteristic.

Figure 3:
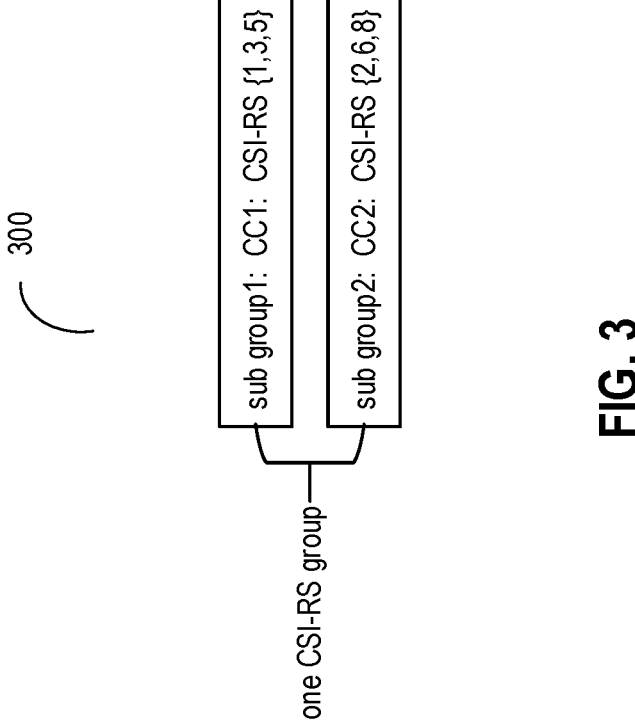
FIG. 3 illustrates a block diagram of an example channel state information reference signal (CSI-RS) group with multiple sub-groups each of which corresponds to one serving cell index in accordance with some embodiments of the present disclosure.

Referring now to FIG. 3, depicted is a block diagram of a state information reference signal (CSI-RS) group 300 with multiple sub-groups each of which corresponds to a respective serving cell index. As depicted, the one CSI-RS group may include two sub groups. The sub group1 may include CSI-RS resources {1,3,5} in CC1. The sub group 2 may include CSI-RS resources {2,6,8} in CC2. One CC means one serving cell. The CSI-RS1 and CSI-RS 2 may satisfy the characteristic and may correspond to set 1. The CSI-RS 3 and CSI-RS 6 may satisfy the characteristic and may correspond to set 2. The CSI-RS 5 and CSI-RS 8 may satisfy the characteristic and may correspond to set 3. Then, the number of set may be 3. The number of bits used to report one CRI/SSB-RI/sub-set index is $\lceil \log_2 3 \rceil = 2$ bits even if the number of resources in the one group is 6. Then each of resources in one set may be respectively associated with a serving cell index. The resources in one set are associated with different serving cell index. The serving cell index associated with one resource may indicate that the signal of the resources is located in the serving cell corresponding to the serving cell index. The resources in each set may be from the two subgroups. In above example, the one group may include two subgroups and 3 sets. Each subgroup may correspond to one serving cell. Each set may include resources satisfy the characteristic.

In some embodiments, the CSI information may include CRI/SSB-RI/set index and quality of each CRI/SSB-RI/set index. The quality can be one of a reference signal received power (RSRP) or a signal-to-noise and interference ratio (SINR). The UE may obtain the CRUSSB-RI/set index and/or quality based on transmitting power of the measurement resource. Since each serving cell may correspond to one respective SSB power, the transmitting power of a CSI-RS resource in one serving cell may be based on a notified power offset between transmitting power of the CSI-RS resource and SSB power of the serving cell. Different resources in different serving cells may be with different transmitting powers.

In some embodiments, the CSI information may include CRI/SSB-RI/set index and quality of each CRI/SSB-RI/set index. One quality of one CRUSSB-RI/sub-set may be based on the first measurement resource and the second measurement resource. One quality of one CRI/SSB-RI/sub-set can based on one set which may include resources with the characteristic. For example, the RSRP/SINR may be based on the average RSRP/SINR of more than one resource in the set.

In some embodiments, the RSRP/SINR may be based on the best RSRP/SINR of more than one resources in the set. Different resources in the set may correspond to different receiving beams of one transmitting beam. Each of the sets may be associated with a repetition parameter with value 'on' indicating that the transmitting filters of resources in one set are same. The repetition parameter associated with the one group can be set to 'off' indicating that transmitting filters between sets in the one group are different. In some embodiments, the RSRP/SINR of one CRI/SSB-RI/sub-set may be based on a predefined resource from the first measurement resource and the second measurement resource in one set. For example, the one quality may be based on the first measurement resource, even if the CRI/

SSB-RI/sub-set may correspond to one set including the first measurement resource and the second measurement resource.

In some embodiments, the UE just may receive the resource in the group and may not report CSI information. For example, the UE may refine the receive beam based on the received resource in the group. In some embodiments, the one group may include only one set. Then the group also may be the one set.

In some embodiments, the characteristic may include QCL (quasi-co-location) relationship. The resources in one set satisfy QCL relationship. For example, the first measurement resource may be QCL-ed with the second measurement resource. In some embodiments, the characteristic may include that their transmitting filter may be same. In some embodiments, the characteristic may include that the resources are in one set for channel measurement. In some embodiments, the characteristic may include that the resources are in one set associated with one CSI reporting. In some embodiments, the characteristic may include that the resources are in one set of a group for channel measurement. In some embodiments, the characteristic includes that the resources are in one set corresponding to one group of physical random access channel (PRACH) resources. A PRACH resource corresponds to at least one of a PRACH transmission: a time location, a frequency location, or preamble, among others. In some embodiments, the characteristic includes that the resources are in one set corresponding to one channel or signal. The unavailable resource of the one channel or signal may be based on the set. The unavailable resource of the one channel or signal may be based on the set. The set may be associated with one channel state information (CSI) reporting. The set may include resources satisfying the characteristic. The CSI report also can indicate that the set satisfies the characteristic. In the above cases the resources in the set satisfy the characteristic comprises that the set satisfy the characteristic.

In some embodiments, the one measurement resource group may include N first type measurement resource corresponding to a first serving cell index or M type second measurement resource corresponding to a second serving cell index. M or N (or both) may be larger than 1. The UE may assume that one of the N first type measurement resource and one of the M second type measurement resource satisfy the characteristic when a condition may be satisfied, such as one of the N first type measurement resource and one of the M second type measurement resource in one set when the condition may be satisfied. The condition may include that their index satisfy some condition, time/frequency location occupied by them satisfy some condition, or serving cell index of resources in the group. The index of one first measurement resource may include the index of one first type measurement resource among the N first type measurement resources. The index of one second type measurement resource may include the index of one second type measurement resource among the M second measurement resources. For example, the condition may include that their index may be same. The N first type measurement resource can be named first subgroup The M second type measurement resource can be named second subgroup.

In some embodiments, the condition may include that the index of one first type measurement resource (X) and the index of one second type measurement resource (Y) follows/ satisfies the formula of $(X-Y) \bmod M = b$. M, b may be an integer. The M, b can be determined based on received signaling from gNB. For example, the measurement resource group may include N resources in serving cell 1 and M resources in serving cell 2. In some embodiments, when one of the N first type measurement resource and one of the M second type measurement resource overlap in time, the one first type measurement and the one second type measurement resources may satisfy the characteristic. That means that the condition may include that these measurement resources overlap in time. The condition also can include that they doesn't overlap in time. In some embodiments, the condition may include that their indexes follow one of formula $(X-Y)$mod $M=i*b$. One set may include resources in C serving cells. The i may be an index of serving cell index among the C serving cells. One set includes C resources from C subgroups of the group and resources in the one set may satisfy the characteristic.

In some embodiments, the time occupied of the two types of measurement resource may overlap. In some embodiments, the time occupied of the two types of measurement resource may not overlap.

In some embodiments, the one measurement resource group for channel measurement may include or correspond to one measurement resource group without multiple subgroups. Then, a resource in the group can be configured with a serving cell index indicating that the resource is located in the indicated serving cell. Further, the one measurement resource group may be configured repetition configuration. If the repetition configuration is set to be "on", then the transmitting filter of resource in the group may be same. If the repetition configuration is set to be "off", the transmitting filter of different resources in the group may be different, or the transmitting filter of different resource without the characteristic in the group may be different. For example, the one group includes multiple sets each of which includes resources satisfy the characteristic and/or with repetition set to 'on'. The one group may be associated with repetition set to 'off'. The transmitting filter of resources from different sets may be different. The transmitting filter of resources from one sets may be same. Each set can also be named as a subset of the group.

In another implementation, the one measurement resource group for channel measurement may include or correspond to at least two measurement resource sub-group. Each sub-group may be configuration with a serving cell index. Each sub-group may correspond one type of measurement resource. The resources from different sub-groups and satisfying the condition may satisfy with the characteristic.

In some embodiments, only when the one measurement resource group is configured with repetition configuration, then the one measurement resource group can include resources in different serving cells.

Similarly, in some embodiments, the one group of channel measurement may include a first resource and a second resource. The first resource and the second resource may be associated with different synchronization rasters, or different frequency locations of synchronization signals. The above description can be applied except replace serving cell with synchronization raster.

In some embodiments, the UE and the base station may determine that a set for channel measurement includes resources. Each of the resources may be associated with a respective value of information The information may include at least one of a serving cell index, a synchronization raster, or a frequency location of a synchronization signal, among others.

II. Determination of a Set of Synchronization System Blocks in Different Synchronization Rasters for Channel Measurement, Determining PRACH Resource or Rate Mating The UE may determine SSBs in different synchronization rasters that satisfy a characteristic (e.g., the characteristic can be referred as a relationship some time) according to at least one of: system information, Physical cell index (PCI) group, frequency of the synchronization raster. In some embodiments, the characteristic may include QCL (quasi-co-location) relationship. The first measurement resource may be QCL-ed with the second measurement resource. In some embodiments, the characteristic may include that their transmitting filter may be same. In some embodiments, the characteristic may include that the SSBs in one set for channel measurement. In some embodiments, the characteristic may include that the SSBs are in one set associated with one CSI reporting. In some embodiments, the characteristic may include that the SSBs are in one set of a group for channel measurement. In some embodiments, the characteristic includes that the SSBs are in one set corresponding to one group of physical random access channel (PRACH) resources. A PRACH resource may correspond to at least one of a PRACH transmission: a time location, a frequency location, or preamble, among others; In some embodiments, the characteristic includes that the SSBs may be in one set corresponding to one channel or signal. The unavailable resource of the one channel or signal may be based on the set. In some embodiments, the characteristic may include that the SSBs are in one set associated with one channel state information (CSI) reporting. The set may include resources satisfying the characteristic. It also can indicate that the set satisfies the characteristic.

For example, the master information block (MIB) or system information block (SIB) may inform that SSB X in synchronization raster A and SSB Y in synchronization raster B satisfy the characteristic. The X may be SSB index among N SSB resources in synchronization raster A. The Y may be a SSB index among M SSB resources in synchronization raster B. The SSB X and SSB Y may satisfy some condition. The condition may include that their indexes satisfy some condition or their time, frequency location satisfy some condition. For example, the condition may include that their indexes may be same, i.e. $X=Y$.

In some embodiments, the condition may include that the indexes X, Y follow the formula of $(X-Y)$mod $M=b$). M, b may be integer. The M and b can be determined based on received signaling from gNB. The M also can be maximum candidate SSB resources in a half frame in one raster. For example, there may be N SSB resource in synchronization raster 1 and M SSB resource in synchronization raster 2. In some embodiments, the condition may include that SSB X and SSB Y are not overlap in time. In some embodiments, the condition may include that SSB X and SSB Y overlap in time. In some embodiments, the condition may include that a first PCI associated with SSB X and a second PCI associated with SSB Y belong to a PCI group or be same. In some embodiments, the PCI group can include one PCI.

The MIB or SIB can inform at least one of following: information indicating the PCI group, frequency of raster 1, frequency of raster 2, M, a, and the condition. For example, the PBCH/MIB corresponding to the raster 1 may inform frequency of raster 2. The PBCH/MID corresponding to the raster 2 may inform frequency of raster 1.

Figure 4:
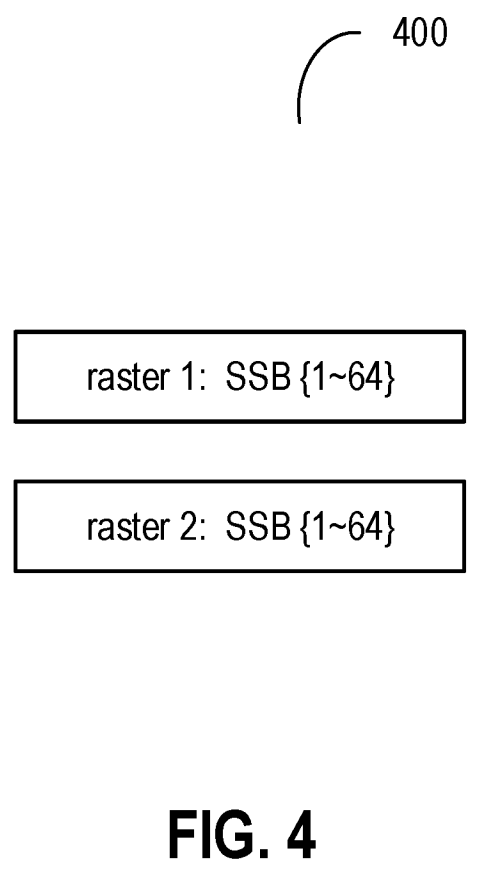

Referring now to FIG. 4, depicted is a block diagram of an set of synchronization signal blocks (SSBs) 400. As depicted, the SSB X and SSB Y may satisfy the characteristic when $(X-Y)$mod $64=2$. In some embodiments, the condition may include that their indexes following one of formula of $(X-Y)\bmod M=i*b$. One set may include resources in C rasters. The i may be index of raster index among the C rasters.

In some embodiments, at least one of following information, frequency of raster 1, frequency of raster 2, M, a, and the condition, may be determined based on the physical cell index (PCI) group and frequency of the synchronization raster. For example, if the SSB X is associated with a first PCI in first PCI group and the SSB Y is associated with a second PCI in second PCI group, then the SSB X and the SSB Y may satisfy the characteristic when they satisfy the condition. The first PCI and the second PCI may have corresponding relationship. For example, the first PCI and the second PCI may be same PCI. The first PCI group and the second PCI group can be same group.

In some embodiments, the SSB X and the SSB Y may be associated with a same group of PRACH resources. The UE transmits a PRACH resource from the same group of PRACH resources indicating that the UE selects the set including the SSB X and SSB Y. There may be multiple SSB sets. Each set may include SSB resource satisfying the characteristic and in different synchronization raster. Each set may be associated with one group of PRACH resources. The UE may select the set and transmits a PRACH resource from the group of PRACH resources corresponding to the selected set. The group of PRACH resources can includes one or more PRACH resource. If it includes one PRACH resource, the group of PRACH resources can also be named PRACH resource.

Similarly, the UE may determine SSBs associated with different PCIs (physical cell indexes) in a same frequency satisfying the characteristic according to at least one of: system information, physical cell index (PCI) group, frequency of the synchronization raster, or frequency of the SSB, among others. For example, the system information may inform a PCI group and the information of the same frequency (e.g., the frequency resource of the SSB). Then SSBs associated with different PCIs in the PCI group may satisfy the characteristic when a condition is met. The condition may be determined based on SSB index or time/frequency location of the SSB. For example, the condition may include that the SSBs with same SSB index (e.g., the SSBs with same SSB index and with different PCIs in the PCI group) may satisfy the characteristic. The condition can may include that the indexes of the two SSBs follow a formula $(X-Y)\bmod M=b$. Under this condition, SSB X with a first PCI in the PCI group and SSB Y with a second PCI in the PCI group may be to satisfy the characteristic when $(X-Y)\bmod M=b$. The condition can also be that they overlap in time such as the SSBs associated with different PCIs in the PCI group and overlapping in time satisfying the characteristic. The PCI group or the information of the same frequency can also be predefined without any signaling from gNB, or the system information may notify whether the UE can assume a SSB associated with a different PCI in the predefined PCI group in the predefined frequency of the SSB satisfying the characteristic.

III. Determination of a Set of Reference Signal Resource from Multiple Reference Signal Resources for Rate Mating;

The UE may determine a reference signal resource set from multiple reference signal resources and may determine available resources of one channel or signal. The reference signal resource set may include SSB set or periodic CSI-RS resource set. In following description, an example of SSB set is discussed. The periodic CSI-RS resource set can be obtained similarly except for the replacement of the SSB with CSI-RS.

In some embodiments, the multiple SSB resources may be associated with one PCI. The resource element (RE) or physical resource block (PRB) or orthogonal frequency division multiplexing (OFDM) symbol occupied by a SSB resource in the one SSB resource set may be unavailable for the one channel or signal. The RE/PRB/OFDM occupied by a SSB resource not in the SSB resource set and from the multiple SSB resources may be available for the one channel or signal. The channel may include at least one of a physical downlink control channel (PDCCH), physical data shared channel (PDSCH), physical uplink share channel (PUSCH), physical uplink control channel (PUCCH), and physical random access channel (PRACH), among others. The signal may include downlink reference signal or uplink reference signal.

Figure 5:
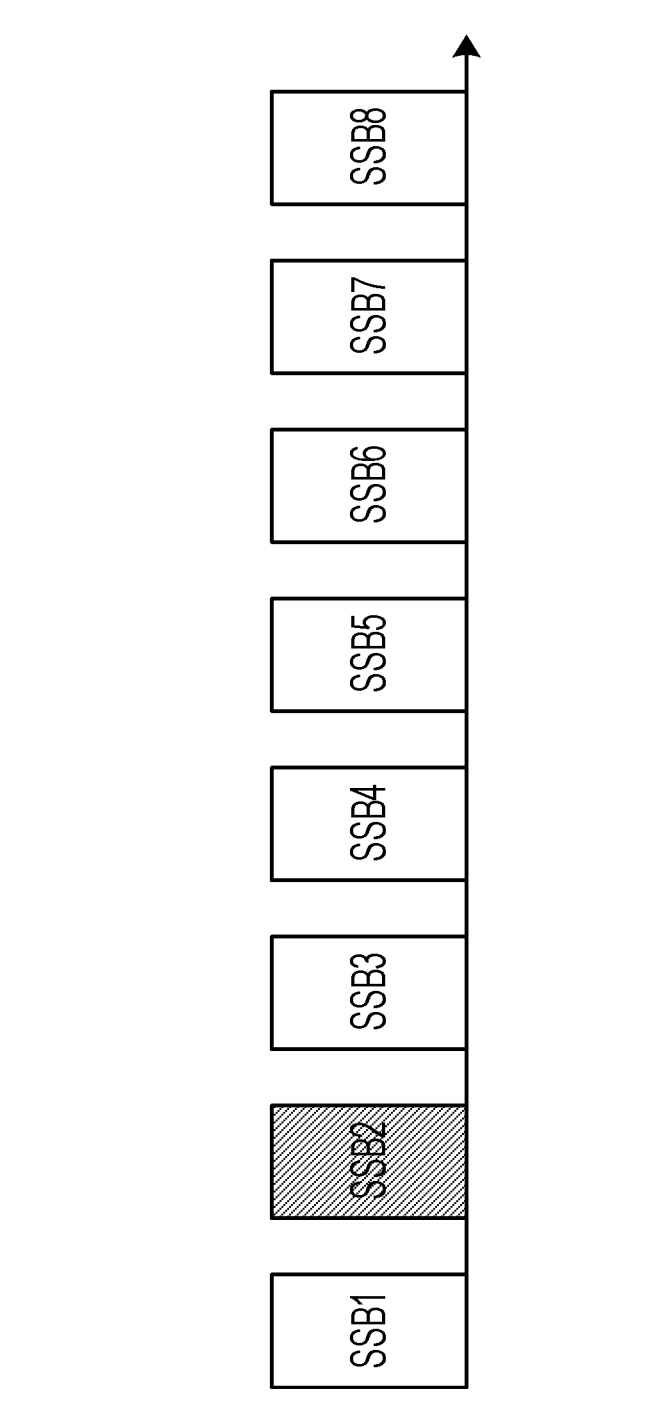
FIG. 5 illustrates a block diagram of an example of determining multiple transmitted synchronization signal blocks (SSBs) according to signaling from a base station in accordance with some embodiments of the present disclosure.

Referring now to FIG. 5, depicted is a block diagram of determining multiple transmitted synchronization signal blocks (SSBs) according to signaling from a base station (e.g., gNB). In some embodiments, the multiple SSB resources may include the transmitted SSB and may not include SSB resource not transmitted by gNB. The transmitted SSB may be notified by the gNB. As depicted, the gNB may inform that the gNB transmits {SSB1,SSB3-8} and does not may transmit SSB2. The RE/OFDM/PRB corresponding to SSB 2 may be available for the channel or signal. Then, the multiple SSB resources may include {SSB1,SSB3-8}. For one PDSCH, only RE/OFDM/PRB of part of {SSB1,SSB3-8} may be unavailable resource of the PDSCH. Other SSB rather than the partial SSB in the transmitted SSB may not be used to get available resource of the PDSCH (e.g., RE/OFDM/PRB of other SSB rather than the partial SSB in the transmitted SSB may be available resource of the PDSCH). For example, the RE/PRB/OFDM of {SSB1, SSB 5} may be unavailable for the PDSCH. The RE/PRB/OFDM of {SSB3-4,SSB6-8} may be available for the PDSCH. For example, the beam of {SSB1,SSB5} and the beam of PDSCH may be similar. There may be high interference between these beams. But the beam of {SSB3-4,SSB6-8} and the beam of PDSCH may be very different. There may be low interference between them.

In some embodiments, different channels or signals of one serving cell may correspond to different reference signal resource sets to obtain the unavailable resource for the different channels or signals. The unavailable resource of one channel or signal may be obtained according to resource of one set corresponding to the one channel or signal. For example, PDSCH1 may correspond to {SSB1,SSB6}, then only the RE/OFDM/PRB of {SSB1,SSB6} may be unavailable resource for PDSCH1 and the RE/OFDM/PRB of {SSB3-5,SSB7-8} may be available resource for PDSCH1. PDSCH2 may correspond to {SSB5,SSB8}, then only the RE/OFDM/PRB of {SSB5,SSB8} may be unavailable resource for PDSCH2 and the RE/OFDM/PRB of {SSB1, SSB3-4, SSB6-7} may be available resource for PDSCH2.

The UE may determine the reference signal resource set according at least one of following method.

In some embodiments, the UE may obtain the set according to a TCI state/a spatial relationship associated with the channel/signal. Each TCI state/spatial relationship may be associated with one set. In some embodiments, the reference signal resource in the set may be QCL-ed with the reference signal in the TCI state or the spatial relationship. The associated relationship between TCI state/spatial relationship and set also can be notified by signaling form gNB and may be determined based on the QCL relationship. Each set associated with the TCI state/spatial relationship can include one or more SSBs which may be QCL-ed with reference signal in the TCI state or spatial relationship of the channel or signal. For example, each set associated with the TCI state/spatial relationship can include one or more SSBs which may be QCL-ed with reference signal in the TCI state or spatial relationship of the channel or signal with respect to (or regarding on) QCL-Type D, such as Spatial Rx parameter. In some embodiments, the gNB may inform UE multiple sets of SSB. Each set associated with the TCI state/spatial relationship can be the set that includes a SSB which may be QCL-ed with reference signal in the TCI state or spatial relationship of the channel or signal. In some implementation, each set associated with the TCI state/ spatial relationship can be the set includes a SSB which may be QCL-ed with reference signal in the TCI state or spatial relationship of the channel or signal with respect to QCL-Type D. The number of SSB in the set can be one or more.

In some embodiments, to determine the reference signal resource set, the UE may determine the set according to activated TCI state list for downlink channel in one serving cell. The set may include reference signal which is QCL-ed with reference signal in the activated TCI state list. The downlink channel may include at least one of PDSCH, or PDCCH.

In some embodiments, the number of reference signal in the set may be smaller than or equal to the number of the multiple reference signal resources. The set can also be named as a subset of the multiple reference signal resources.

Figure 6:
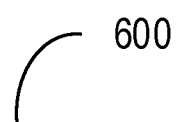
FIG. 6 illustrates a block diagram of a structure of a synchronization signal/PBCH block (SSB) in accordance with some embodiments of the present disclosure.
Figure 6:
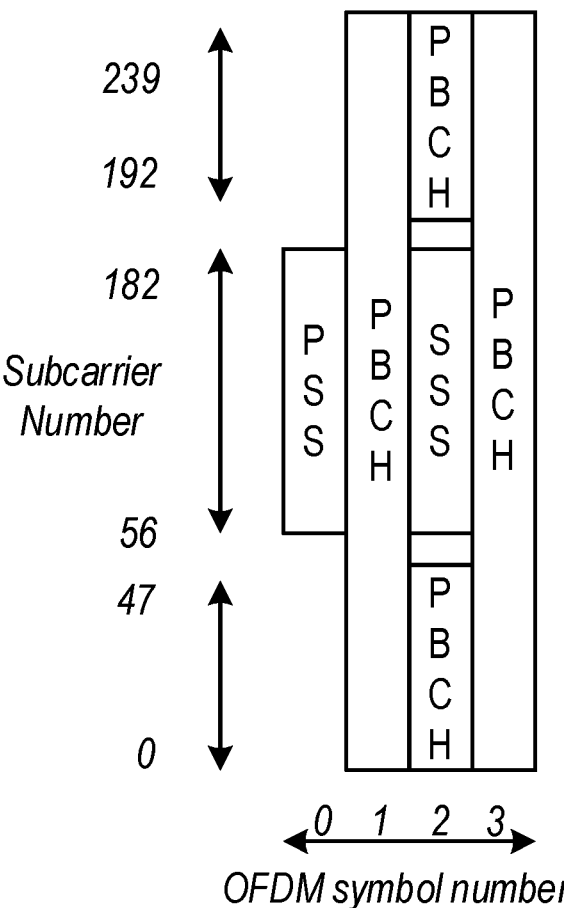

IV. Determination of Only the RE/PRB/OFDM of Synchronization Signal in One SSB Unavailable for a Channel or Signal The UE may determine that the RE/PRB/OFDM of synchronization signal in one SSB block may be unavailable for one channel or signal. The RE/PRB/OFDM of PBCH in the one SSB block may be available for the one channel/signal. Referring now to FIG. 6, depicted is a block diagram of a structure of a synchronization signal and PBCH block (SSB). The structure of the one SSB block may be as shown.

In some embodiments, the SSB block may be associated with a PCI of a neighboring cell. If the SSB block may be associated with a PCI of a serving cell, then both the RE/PRB/OFDM occupied by the SS and the RE/PRB/ OFDM occupied by the PBCH may be unavailable for the PDSCH. In some embodiments, the SSB block may be associated with a PCI configured in a dedicated parameter, not in a cell-specific parameter. In some embodiments, the PBCH may not be transmitted by gNB. In some embodiments, the UE may not receive the PBCH.

V. A Delay of Applying a TCI State/Beam State Indication Depends on the Cell-Related Information of the TCI State/ Beam State A DCI may indicate a unified TCI state for channel or signal, and then the UE may feedback an ACK for the DCI if the UE receives the DCI. The unified TCI state will be applied to starting in a first slot that is at least X ms or Y symbols after the last symbol of the acknowledgment of the DCI. The X/Y may depends on the relationship between a first cell-related information of the old unified TCI state indicated before the DCI and a second cell-related information of the new unified TCI state indicated in the DCI. If the second cell-related information belongs to or is equal to the second cell-related information, then the X/Y may be a first value, otherwise the X/Y is a second value. The second value may be larger than the first value. The difference between the first value and the second value may be a fix value or a value based on signaling or capability of the UE. The cell-related information may include at least one of: PCI,SSB information, sub-carrier spacing, or frequency information. The unified TCI state can also be named beam state which indicates the QCL-RS the downlink channel/signal, and/or reference for getting spatial transmitting filter of uplink channel or signal. The unified TCI state can be used at least one of: PDSCH, PDCCH, PUSCH, PUCCH, CSI-RS, PRACH, or SRS Similarly, a MAC-CE may indicate a new TCI state for channel or signal, and then the UE feedback an ACK for PDSCH including the MAC-CE. The new TCI state may be applied to the channel or signal starting in a first slot after 3 ms after the last symbol of the acknowledgment of the DCI if the cell-related information of the new TCI state symbol belongs to/equal to the cell information of old TCI state list activated before the first slot. Otherwise, The new TCI state may be applied to the channel or signal in a first slot after Zms, wherein Z is larger than 3 m. The new TCI state can also be a unified TCI state.

VI. Configuration of Reference Signal Resources for Measurement

A channel measurement reference may correspond to a channel measurement reference signal (RS) resource. One CMR group may include reference signal resources in different serving cells The one group may be associated with one CSI reporting. The UE may receive the reference signals (in the group) in different serving cells assuming that the reference signals satisfy the characteristic, or to obtain CSI information from the RSs which will be reported to gNB by the UE. The CSI information may be based on the one CMR group. The CSI information may include CRI (CSI-RS resource indicator)/ SSB-RI/set index. One CRI/SSB-RI/set-index may correspond to one set that includes the reference signal resources satisfying a characteristic.

The number of bits used to report the CRI/SSB-RI/set index may be based on the number of sets instead of the number of resources in the one group. The CSI information may include CRI/SSB-RI/set index and quality. One piece of quality may correspond to one set. The quality may be an average quality of resources in the set, or best quality across resources in the set, or quality of a predefined resource in the set. The CSI information may be based on transmitting power of each measurement resource (e.g., considering the difference between transmitting power of different resources in the one group).

The one group may include multiple sub groups. Each sub group may correspond to one serving cell index. A resource in the one group can be configured with serving cell index indicating that the resource is located in the indicated serving cell. The one group may include multiple sets. Each set may include resources that satisfy a characteristic resources that in turn satisfy the characteristic are in different serving cells.

Resources may be from different sub groups and satisfy a condition that is in one set. The condition may be based on at least one of index of resource, resource of the reference signal resource, or serving cell index, among others. The condition may include one of: index among each subgroup is to be same, overlaps in time, not overlap in time, and follow $(X-Y)\mod M=b$, $(X-Y)\mod M=i*b$, among others.

Each set may correspond to one PRACH resource. The UE may select one set and then select a PRACH resource corresponding to the one set. The characteristic may include QCL relationship, or same transmitting filter. A set may include more than two resources. Different resources may be in different serving cell. The one CMR group may be configured with a repetition parameter. Only a group with configuration of repetition can include resources in different serving cells.

The UE may determine SSBs in different synchronization rasters that satisfy a characteristic according to at least one of: system information, physical cell index (PCI) group, or frequency of the synchronization raster, among others. The SSBs associated with different PCIs (physical cell indexes) in same frequency may satisfy the characteristic according to at least one of: system information, physical cell index (PCI) group, frequency of the synchronization raster, or frequency of the SSB, among others.

The characteristic may include QCL (quasi-co-location) characteristic. The characteristic may include that their transmitting filter may be same. If a condition is met, the SSB X in a first raster and the SSB Y in a second raster may satisfy the characteristic, or the SSB X in a first PCI group and the SSB Y in a second PCI group may satisfy the characteristic The condition may be based on at least one of index of resource, resource of the reference signal resource, or serving cell index. The condition may include one of: indexes among each subgroup may be same, overlap in time, not overlap in time, follow (X−Y)mod M=b, (X−Y)mod M=i*b The information may be in the system information. One set that may include SSB in different rasters and satisfy the characteristic corresponding to one PRACH resource. Some parameter configuration of the two synchronization rasters or two SSBs may satisfy some restriction.

The UE may determine a reference signal resource set from multiple reference signal resources and may determine available resource of one channel or signal based on the set. The reference signal resource set may include SSB set and/or periodic CSI-RS resource set.

If the set may be SSB set, the multiple reference signal resources may include SSB transmitted SSB resources. The transmitted SSB resources may be notified by signaling from gNB. The multiple reference signal resources may correspond to one serving cell or one PCI The reference signal resource set may be obtained using one of the following methods. In some embodiments, the UE may determine that the RE/PRB/OFDM of synchronization signal is unavailable in one SSB block for one channel or signal. The RE/PRB/OFDM of PBCH in the one SSB block may be available in one SSB block for one channel or signal. The SSB block may be associated with a PCI of a neighboring cell. The SSB block may be associated with a PCI configured in a dedicated parameter, not a cell-specific parameter. The PBCH may not be transmitted by gNB. The UE may not receive the PBCH.

VII. Method of Configuring Reference Signaling

Figure 7:
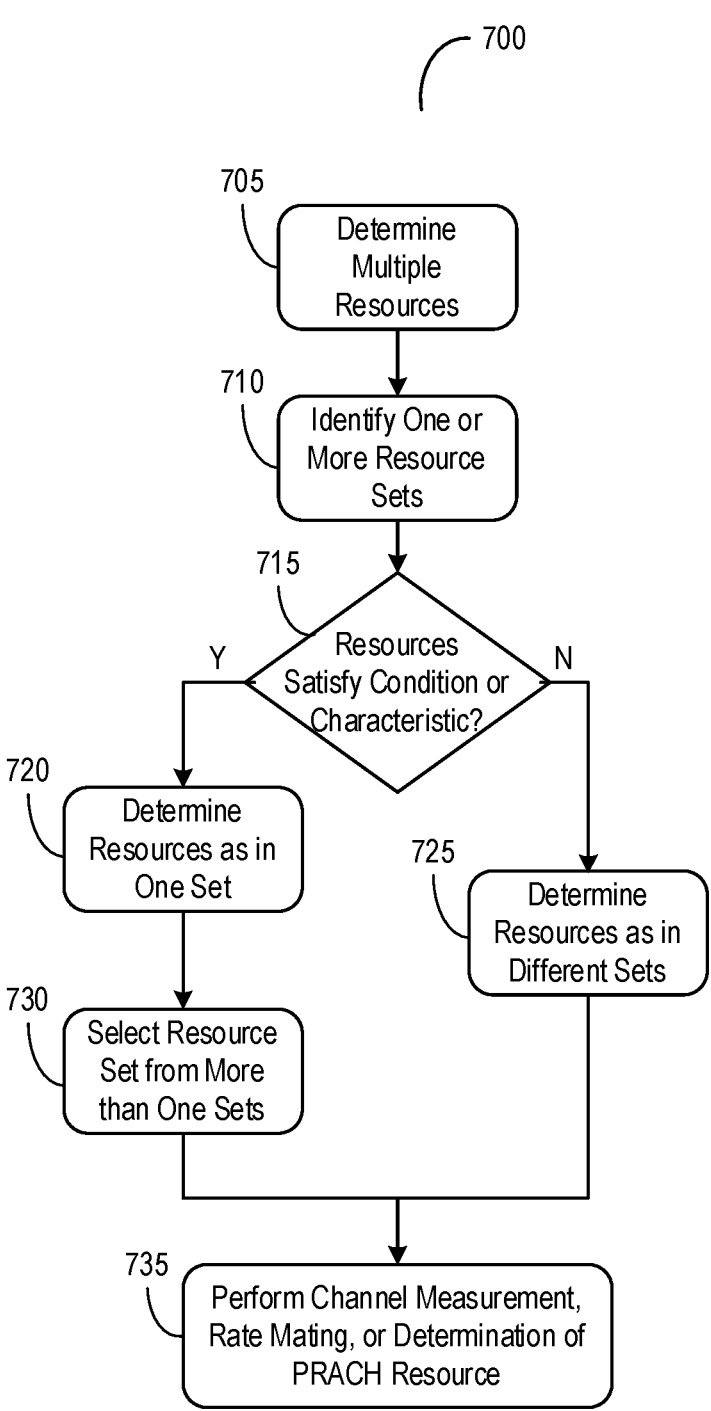
FIG. 7 illustrates a flow diagram of a method of configuring reference signaling in accordance with some embodiments of the present disclosure.

Referring now to FIG. 7, depicted is a flow diagram of a method 700 of configuring reference signaling. The method 700 may be implemented using or performed by any of the components detailed above, such as the UE 104 or 204 and BS 102 or 202, among others. In brief overview, a wireless communication device may determine or be configured with multiple resources (705). The wireless communication device may identify one or more resource sets (710). The wireless communication device may determine whether resources from the multiple resources satisfy a characteristic or a condition (715). If the resources of the multiple resources are determined to satisfy the condition or the characteristic, the wireless communication device may determine the resources are in one set (720). Conversely, if the resources are determined to not satisfy the condition or the characteristic, the wireless communication device may determine the resources are in different sets (725). The wireless communication device may also select a resource set from the more than one sets (730). The wireless communication device may perform one of channel measurement, rate mating, or determining PRACH resource to transmit (735).

In further detail, a wireless communication device (e.g., UE 104 or 204) may generate, determine, or may be configured with multiple resources (705). The wireless communication device may receive the multiple resource from a wireless communication node (e.g., BS 102 or 202). One of more resources of the multiple resource sets may be for channel measurement, rate mating or determining PRACH resource to transmit. The number of resources in each set may be equal to or more than one. Each resource in each set may be associated with a respective value of information. The information may identify or include one or more of: a serving cell index, a synchronization raster index, a physical cell index (PCI), a channel state information reference signal (CSI-RS) index, or a synchronization signal block (SSB) index, among others. In the case where the number of the resources in the set is more than one, the resource set may include different resources associated with differing values of the information. Using the method, the wireless communication can quickly get/obtain CSI, quickly find a PRACH resource, improve the spectral efficiency and improve the flexibility of scheduling the measurement result.

The wireless communication device may determine or identify one or more resource sets from the multiple resources to evaluate for use (710). The identification and evaluation may be repeated over the resource sets in the multiple sets. Each set of the multiple resource sets may include resources from a plurality of subgroups of a group. Each subgroup may correspond to a respective value of the information. In some embodiments, each subgroup may have resources corresponding to a same value of the information. The resources in each set may include one or more of: measurement reference signal (RS) resources, channel state information RS (CSI-RS) resources, or synchronization signal block (SSB) resources, among others.

The wireless communication device may identify or determine resources from the multiple resources satisfy a characteristic or a condition (715). To determine, the wireless communication device may compare the one or more resources of the multiple resources with one or more conditions or characteristics. When the resources of the set match the specifications of the conditions (or the characteristics), the wireless communication device may determine that the resources are in one set. On the other hand, when the resources of the multiple resources do not match any of the specifications of the conditions (or the characteristics), the wireless communication device may determine that the resources are in different set or not in one set.

The condition may be based on one or more of: a resource index among resources in each subgroup, a time location occupied by the resources in each subgroup, the value of the information, or a frequency location occupied by the resources in each subgroup, among others. In some embodiments, the condition may identify or include a condition that resource indexes of the resources in the identified set are same. Under the condition, a resource index of one of the resources in the set may be specified to be a resource index among resources in one subgroup corresponding to the one of the resources.

In some embodiments, the condition may identify various parameters regarding characteristics among the resources in the set. In some embodiments, the condition may identify or include that time locations occupied by the resources in the identified set. In some embodiments, the condition may identify or include a condition that frequency locations occupied by the resources in the one subgroup are different. In some embodiments, the condition to be satisfied may include or identify a condition that a resource index X of a first resource and a resource index Y of a second resource, satisfy: (X–Y)mod M=b. The resources in the first set may include the first resource and the second resource, the first resource and the second resource may be associated with a respective value of the information. In some embodiments, the condition may include or identify a condition that the resource index X of the first resource and the resource index Y of the second resource, satisfy (X–Y)mod M=i*b. The resources in the first set may include the first resource and the second resource. The first resource and the second resource may be associated with a respective value of the information.

In the conditions identified above, M and b may be each an integer value. i may be a value of the information associated with the first resource or second resource. A resource index of one of the resources in the first set may correspond or may be a resource index among resources in one subgroup corresponding to the one of the resources. In some embodiments, at least one of M, b, or a number of multiple pieces of the information may be based on system information. In some embodiments, M is maximum number of SSBs in a half frame for one synchronization raster. In some embodiments, i may be a value of the information among the multiple pieces of the information. A number of the resources in the first set may be equal to or larger than the number of the multiple pieces of the information. The first set may include resources each of which is associated with one piece of the information from the multiple pieces of the information.

In some embodiments, the condition may relate to synchronization rasters associated with system information blocks (SSBs), such as a first SSB and a second SSB. In some embodiments, the condition is based on at least one of: SSB indexes of the first SSB and the second SSB, time location occupied by the first SSB and the second SSB, or a value of the information associated with the first SSB or the second SSB, among others. In some embodiments, the condition may identify or include a condition that the time location occupied by the first SSB and the second SSB are in different times. In some embodiments, the condition may identify or include a condition that an index (X) of the first SSB and an index (Y) of the second SSB, satisfy: (X–Y)mod M=b. In some embodiments, the condition may identify or include a condition that the index (X) of the first SSB and the index (Y) of the second SSB, satisfy: X=Y. In some embodiments, the condition may identify or include a condition that the index (X) of the first SSB and the index (Y) of the second SSB, satisfy: (X–Y) mod M=i*b. In some embodiments, a condition that a first PCI associated the first SSB and a second PCI associated with the second SSB may have corresponding relationship.

In the conditions identified above, in some embodiments, M and b may be each an integer value. i may be an index of the information associated with the first SSB or the second SSB. X may be the index of the first SSB among SSBs associated with a same value of the information as that corresponds to the first SSB, and Y may be the index of the second SSB among SSBs associated with a same value of the information as that corresponding to the second SSB. In some embodiments, at least one of M, b, or a number of multiple pieces of the information may be based on system information. In some embodiments, M may be maximum number of SSBs in a half frame for one synchronization raster. In some embodiments, i may be a value of the information among the multiple pieces of the information. A number of SSBs in the set may be equal to or larger than the number of the multiple pieces of the information. The set includes SSBs each of which may be associated with one piece of the information from the multiple pieces of the information. In some embodiments, the system information as specified in the condition may identify or include information associated with the SSBs. The information may include one or more of: a PCI group, information of the same frequency, or information on whether the wireless communication device can assume that two SSBs associated with different PCIs in a predefined PCI group in a predefined frequency satisfy the characteristic, among others.

Each condition may correspond to one or more characteristics across the resources in the set determined to be satisfying the condition. In some embodiments, the characteristic may identify or include the resources in the set are to be in a group for channel measurement. In some embodiments, the characteristic may identify or include the resources in the set are to satisfy a quasi co-location (QCL) characteristic. In some embodiments, the characteristic may identify or include that the transmitting filters between the resources in the set are to be same. In some embodiments, the set is associated with a repetition parameter with value 'on'. In some embodiments, the characteristic may identify or include the set is to be one set for channel measurement. In some embodiments, the characteristic may identify or include that the set is to correspond to one a group of physical random access channel (PRACH) resources. In some embodiments, the characteristic may identify or include that the set is to correspond to one channel or signal. The unavailable resource of the one channel or signal may be based on the set. In some embodiments, the characteristic may identify or include that the set is to be associated with one channel state information (CSI) reporting.

In some embodiments, the characteristic may identify particular characteristics of resources in the set satisfying the condition related to system synchronization blocks (SSBs). In some embodiments, when the information includes a synchronization raster index, the wireless communication device may determine the set having the SSBs satisfying the characteristic, with each SSB corresponding to a respective synchronization raster. If the condition is met, a first SSB in a first synchronization raster and a second SSB in a second synchronization raster may satisfy the characteristic. In some embodiments, the SSBs may be determined to satisfy the characteristic, such as the system information, a physical cell index (PCI) group, or a frequency location occupied by the synchronization rasters, among others. In some embodiments, the SSBs may satisfy the characteristic according to one or more of: system information, a PCI group, or a frequency location of the SSBs, among others. In some embodiments, a parameter configuration of the synchronization rasters or the SSBs in the selected set may satisfy a defined restriction. In some embodiments, a configuration of the SSBs in the selected set may satisfy a defined restriction. The defined restriction may be part of the characteristic regarding the SSBs.

In some embodiments, the system information may identify or include information about the SSBs. The information may include one or more of: a PCI index, information of a synchronization raster, or information on whether the wireless communication device can assume that the SSBs in different synchronization rasters satisfy the characteristic, among others. If the information includes a PCI, the wireless communication device may determine the set having the SSBs in the set satisfying the characteristic, with each SSB associated with a respective PCI and in the same frequency (e.g., same frequency band). For instance, if a condition is met, a first SSB with a first PCI and a second SSB with a second PCI may the characteristic.

If the resources of the multiple resources are determined to satisfy the condition or the characteristic, the wireless communication device may determine the resources are in one set (720). The wireless communication device may identify or determine the resource set as satisfying at least one characteristic. The resources in the set may be determined to satisfy the characteristic. In some embodiments, the wireless communication device may determine multiple sets from the super multiple set. Each set in the selected multiple set may identify or include resources respectively satisfying the characteristics. Each of the resources in a corresponding set may be associated with a respective value of the information. In some embodiments, the set may include more than two resource satisfying the characteristic. The more than two resources may be associated with different values of the information. In some embodiments, the wireless communication device may determine the set according to a receiving signaling. Conversely, if the resources are determined to not satisfy the condition or the characteristic, the wireless communication device may determine the resources are in different sets (725).

The wireless communication device may also select a resource set from the more than one sets (730). In the case where the wireless communication device determines more than one set from the multiple resources, the wireless communication device may select the resource set from the one or more resource sets for a group for channel measurement. The characteristic may identify or indicate that the set of resources is in the group for channel measurement. The resources selected for the group may be all related to one or more values of information to be used in measurement. In some embodiments, the group for channel measurement may be associated with one reporting. A number of groups may be associated with the one reporting may be more than or equal to one. The group for channel measurement may extend to multiple sets. In some embodiments, the group for channel measurement may include multiple sets from the super multiple set. Each set in the multiple sets may include resources that satisfy the characteristic. In some embodiments, the group is associated with a repetition parameter with value 'off'. In some embodiments, the resources in the set satisfy a quasi co-location (QCL) relationship with respect to spatial receive parameter. In some embodiments, each of the resources in the corresponding set may be associated with a respective value of the information.

The group may include a plurality of subgroups. In some embodiments, each subgroup may correspond to a respective value of the information. In some embodiments, each subgroup may have resources in the group that corresponds to same value of the information. The resource in the group may be configured with the value of the information. In some embodiments, the group may include multiple sets selected from the super multiple resource sets. In some embodiments, each of the sets in the multiple sets of the group may include resources that respectively satisfy the characteristic. In some embodiments, if the information includes the serving cell index, a resource in the group may be configured with an index of a serving cell. The index may indicates that the resource is located in the serving cell. In some embodiments, the resource in a set may be from the plurality of subgroups of the group and satisfy the condition. In some embodiments, the set may be determined as having the resources form the plurality of subgroups and satisfy the condition.

The group for channel measurement may be configured with various parameters. In some embodiments, the group may be configured with a repetition parameter. The repetition parameter may be set to "on" to have the transmitting filter of the resources in the group to be the same. Alternatively, the repetition parameter may be set to "off" to have the transmitting filter of the resources in the group to be different. In some embodiments, if the group is configured with the repetition parameter, the group may be selected to include the set. In some embodiments, if the group is not configured with the repetition parameter, the group may be set to include resources. Each of the resources may be with the same value of the information.

The wireless communication device may perform channel measurement, rate mating, or determination of a PRACH resource to transmit (735). The wireless communication device may determine, according to the selected resource set, at least one of reported CSI, unavailable resource for a channel, signal, or PRACH resource to transmit. Rating mating may include determining an available resource for a channel or signal. The multiple resources may correspond to a group for channel measurement and may be associated with one CSI report setting. The multiple resources can also correspond to a group of transmitted SSB. In some embodiments, the group may include multiple sets from the super multiple set. Each set may include resources satisfying the characteristic and the number of resources in the set may be more than one. In some embodiments, the wireless communication device may receive a reference signal in the resources of the set according to the characteristic. In some embodiments, the wireless communication device may determine CSI to report based on the set. In some embodiments, the wireless communication device may transmit a PRACH based on the set. The wireless communication device in turn may receive a channel or a signal. An unavailable resource for the channel or the signal may be based on the resources of the set.

The wireless communication device may use the group in determining channel state information (CSI). In some embodiments, the group may be associated with at least one reporting of channel state information (CSI). In some embodiments, the wireless communication device may retrieve, identify, or otherwise receive reference signals (RSs) of the resources in at least one set corresponding to the group. The wireless communication device may generate, calculate, or otherwise determine the CSI from the RSs of the resources. In some embodiments, the CSI may be based on the group. In some embodiments, the wireless communication device may calculate or determine the CSI according to transmitting power differences between resources of the set. With the determination, the wireless communication may convey, indicate, or otherwise report the CSI to the wireless communication node.

In some embodiments, the CSI may include one or more of: a CSI reference signal resource indicator (CRI), a synchronization signal block (SSB) resource indicator (SSB-RI), or a set index, corresponding to the set, among others. In some embodiments, the CRI, SSB-RI, or the set index may be reported or indicated using a number of bits that is based on a total number of sets in the group. In some embodiments, the CRI, SSB-RI, or the set index may be reported or indicated by transmitting a channel resource (e.g., a physical random access channel (PRACH)) from a channel resource group associated with the set. In some embodiments, the CSI may include a quality indicator corresponding to the set. In some embodiments, the quality indicator may be indicative of an average quality of resources of the set, a highest quality between the resources of the set, or quality of a predefined resource of the set, among others.

The wireless communication device may use the group in determining channel state information reference signals (CSI-RS). In some embodiments, the wireless communication device may identify or receive a plurality of reference signal (RS) resources. The receipt may be from the wireless communication node. In some embodiments, the wireless communication device may determine the set of resources including resources from the plurality of RS resources. The set may be from the selected sets for channel measurement. In some embodiments, the wireless communication device may determine the set in accordance with: a transmission configuration indicator (TCI) state or a spatial relation association with the channel or signal; a list of activated TCI states for downlink (DL) channel in a serving cell. In some embodiments, the wireless communication device may determine an available resource of a channel or signal according to the set. In some embodiments, each RS resource may identify or include one or more of: at least one SSB resource or a periodic CSI-RS resources.

In some embodiments, a number of resources in the set may be smaller than a number of the plurality of RS resources. In some embodiments, the plurality of RS resources may be in the same frequency band. In some embodiments, the number of RS resources in the set in one. In some embodiments, if each of the RS resources identifies or includes a SSB resource, the plurality of RS resources may include a plurality of SSB resources. Each of the SSB resources may include transmitted SSB resources that are indicated by signaling from a wireless communication node. In some embodiments, the plurality of RS resources may correspond to one serving cell or one physical cell index (PCI), or may be in a same SSB frequency. In some embodiments, a resource element (RE) or physical resource block (PRB) or orthogonal frequency division multiplexing (OFDM) symbol occupied by a synchronization signal of one SSB resource in the set may be an unavailable resource for the channel or signal. In some embodiments, the RE or PRB or OFDM symbol occupied by a physical broadcast channel of the one SSB resource in the set may be an available resource for the channel or signal.

In using the resource sets of the group, the wireless communication device may generate or determine channel related resources in determining the channel measurement. In some embodiments, the wireless communication device may select from the multiple resource sets. In some embodiments, the wireless communication device may identify, generate, or otherwise determine a mapping between the selected sets and groups of channel resources (e.g., physical random access channel (PRACH) resources). The determination of the mapping may be in accordance with the resources in the selected multiple sets. In some embodiments, the wireless communication device may send, provide, or transmit a PRACH resource form the group of PRACH resources associated with the selected set.

While various embodiments of the present solution have been described above, it should be understood that they have been presented by way of example only, and not by way of limitation. Likewise, the various diagrams may depict an example architectural or configuration, which are provided to enable persons of ordinary skill in the art to understand example features and functions of the present solution. Such persons would understand, however, that the solution is not restricted to the illustrated example architectures or configurations, but can be implemented using a variety of alternative architectures and configurations. Additionally, as would be understood by persons of ordinary skill in the art, one or more features of one embodiment can be combined with one or more features of another embodiment described herein. Thus, the breadth and scope of the present disclosure should not be limited by any of the above-described illustrative embodiments.

It is also understood that any reference to an element herein using a designation such as "first," "second," and so forth does not generally limit the quantity or order of those elements. Rather, these designations can be used herein as a convenient means of distinguishing between two or more elements or instances of an element. Thus, a reference to first and second elements does not mean that only two elements can be employed, or that the first element must precede the second element in some manner.

Additionally, a person having ordinary skill in the art would understand that information and signals can be represented using any of a variety of different technologies and techniques. For example, data, instructions, commands, information, signals, bits and symbols, for example, which may be referenced in the above description can be represented by voltages, currents, electromagnetic waves, magnetic fields or particles, optical fields or particles, or any combination thereof.

A person of ordinary skill in the art would further appreciate that any of the various illustrative logical blocks, modules, processors, means, circuits, methods and functions described in connection with the aspects disclosed herein can be implemented by electronic hardware (e.g., a digital implementation, an analog implementation, or a combination of the two), firmware, various forms of program or design code incorporating instructions (which can be referred to herein, for convenience, as "software" or a "software module), or any combination of these techniques. To clearly illustrate this interchangeability of hardware, firmware and software, various illustrative components, blocks, modules, circuits, and steps have been described above generally in terms of their functionality. Whether such functionality is implemented as hardware, firmware or software, or a combination of these techniques, depends upon the particular application and design constraints imposed on the overall system. Skilled artisans can implement the described functionality in various ways for each particular application, but such implementation decisions do not cause a departure from the scope of the present disclosure.

Furthermore, a person of ordinary skill in the art would understand that various illustrative logical blocks, modules, devices, components and circuits described herein can be implemented within or performed by an integrated circuit (IC) that can include a general purpose processor, a digital signal processor (DSP), an application specific integrated circuit (ASIC), a field programmable gate array (FPGA) or other programmable logic device, or any combination thereof. The logical blocks, modules, and circuits can further include antennas and/or transceivers to communicate with various components within the network or within the device. A general purpose processor can be a microprocessor, but in the alternative, the processor can be any conventional processor, controller, or state machine. A processor can also be implemented as a combination of computing devices, e.g., a combination of a DSP and a microprocessor, a plurality of microprocessors, one or more microprocessors in conjunction with a DSP core, or any other suitable configuration to perform the functions described herein.

If implemented in software, the functions can be stored as one or more instructions or code on a computer-readable medium. Thus, the steps of a method or algorithm disclosed herein can be implemented as software stored on a computer-readable medium. Computer-readable media includes both computer storage media and communication media including any medium that can be enabled to transfer a computer program or code from one place to another. A storage media can be any available media that can be accessed by a computer. By way of example, and not limitation, such computer-readable media can include RAM, ROM, EEPROM, CD-ROM or other optical disk storage, magnetic disk storage or other magnetic storage devices, or any other medium that can be used to store desired program code in the form of instructions or data structures and that can be accessed by a computer.

In this document, the term "module" as used herein, refers to software, firmware, hardware, and any combination of these elements for performing the associated functions described herein. Additionally, for purpose of discussion, the various modules are described as discrete modules; however, as would be apparent to one of ordinary skill in the art, two or more modules may be combined to form a single module that performs the associated functions according embodiments of the present solution.

Additionally, memory or other storage, as well as communication components, may be employed in embodiments of the present solution. It will be appreciated that, for clarity purposes, the above description has described embodiments of the present solution with reference to different functional units and processors. However, it will be apparent that any suitable distribution of functionality between different functional units, processing logic elements or domains may be used without detracting from the present solution. For example, functionality illustrated to be performed by separate processing logic elements, or controllers, may be performed by the same processing logic element, or controller. Hence, references to specific functional units are only references to a suitable means for providing the described functionality, rather than indicative of a strict logical or physical structure or organization.

Various modifications to the embodiments described in this disclosure will be readily apparent to those skilled in the art, and the general principles defined herein can be applied to other embodiments without departing from the scope of this disclosure. Thus, the disclosure is not intended to be limited to the embodiments shown herein, but is to be accorded the widest scope consistent with the novel features and principles disclosed herein, as recited in the claims below.

What is claimed is:

1. A method comprising:
   determining, by a wireless communication device, a set of resources, where a number of resources in the set of resources is greater than or equal to one,
   wherein each of the resources is associated with a respective synchronization signal block (SSB) index,
   wherein the set of resources corresponds to a channel or signal, wherein an unavailable resource of the channel or signal is based on the set of resources;
   determining, by the wireless communication device, a plurality of reference signal (RS) resources, wherein the set of resources includes resources from the plurality of RS resources, wherein each of the RS resources includes a SSB resource; and determining, by the wireless communication device, an available resource of the channel or signal according to the set of resources.

2. The method of claim 1, wherein:
   a number of resources in the set of resources is smaller than a number of the plurality of RS resources; and
   the plurality of RS resources is in a same frequency band.

3. The method of claim 1, wherein the number of RS resources in the set of resources is one.

4. The method of claim 1, wherein if each of the RS resources includes a SSB resource, the plurality of RS resources includes a plurality of SSB resources which includes transmitted SSB resources that are indicated by signaling from a wireless communication node.

5. The method of claim 1, wherein the plurality of RS resources corresponds to one physical cell index (PCI) and is in a same SSB frequency.

6. The method of claim 1, comprising:
   determining, by the wireless communication device, the set of resources according to:
   a transmission configuration indicator (TCI) state or a spatial relation associated with the channel or signal.

7. The method of claim 1, comprising:
   determining, by the wireless communication device, the set of resources according to a list of activated TCI states for a downlink channel in a serving cell.

8. The method of claim 1, further comprising:
   determining, by the wireless communication device, multiple sets, wherein each of the multiple sets respectively corresponds to the channel or signal and each of resources in the corresponding set is associated with a respective value of information;
   determining, by the wireless communication device, a mapping between groups of physical random access channel (PRACH) resources and the multiple sets;
   selecting, by the wireless communication device, a set from the multiple sets; and
   transmitting, by the wireless communication device, a PRACH resource from a group of PRACH resources associated with the selected set.

9. The method of claim 1, wherein a physical resource block (PRB) occupied by a synchronization signal of each SSB resource in the set of resources is the unavailable resource for the channel or signal.

10. A wireless communication device, comprising:
    at least one processor configured to:
    determine a set of resources, where a number of resources in the set of resources is greater than or equal to one,
    wherein each of the resources is associated with a respective synchronization signal block (SSB) index,
    wherein the set of resources corresponds to a channel or signal, wherein an unavailable resource of the channel or signal is based on the set of resources;
    determine a plurality of reference signal (RS) resources, wherein the set of resources includes resources from the plurality of RS resources, wherein each of the RS resources includes a SSB resource; and
    determine an available resource of a channel or signal according to the set of resources.

11. The wireless communication device of claim 10, wherein:
    a number of resources in the set of resources is smaller than a number of the plurality of RS resources; and
    the plurality of RS resources is in a same frequency band.

12. The wireless communication device of claim 10, wherein the number of RS resources in the set of resources is one.

13. The wireless communication device of claim 10, wherein if each of the RS resources includes a SSB resource, the plurality of RS resources includes a plurality of SSB resources which includes transmitted SSB resources that are indicated by signaling from a wireless communication node.

14. The wireless communication device of claim 10, wherein the plurality of RS resources corresponds to one physical cell index (PCI) and is in a same SSB frequency.

15. The wireless communication device of claim 10, wherein the at least one processor is configured to:

determine the set of resources according to a transmission configuration indicator (TCI) state or a spatial relation associated with the channel or signal.

16. The wireless communication device of claim 10, wherein the at least one processor is configured to:

determine the set of resources according to a list of activated TCI states for a downlink channel in a serving cell.

17. The wireless communication device of claim 10, wherein the at least one processor is configured to:

determine multiple sets, wherein each of the multiple sets respectively corresponds to the channel or signal and each of resources in the corresponding set is associated with a respective value of information;

determine a mapping between groups of physical random access channel (PRACH) resources and the multiple sets;

select a set from the multiple sets; and transmit, via a transmitter, a PRACH resource from a group of PRACH resources associated with the selected set.

18. The wireless communication device of claim 10, wherein a physical resource block (PRB) occupied by each SSB resource in the set of resources is the unavailable resource for the channel or the signal.

19. A non-transitory computer readable medium storing instructions, which when executed by at least one processor, cause the at least one processor to:

determine a set of resources, where a number of resources in the set of resources is greater than or equal to one, wherein each of the resources is associated with a respective synchronization signal block (SSB) index, wherein the set of resources corresponds to a channel or signal, wherein an unavailable resource of the channel or signal is based on the set of resources;

determine a plurality of reference signal (RS) resources, wherein the set of resources includes resources from the plurality of RS resources, wherein each of the RS resources includes a SSB resource; and determine an available resource of a channel or signal according to the set of resources.

20. The non-transitory computer readable medium storing instructions of claim 19, wherein:

a number of resources in the set of resources is smaller than a number of the plurality of RS resources; and the plurality of RS resources is in a same frequency band.

\* \* \* \* \*